(12) United States Patent
Allard et al.

(10) Patent No.: US 10,975,999 B2
(45) Date of Patent: *Apr. 13, 2021

(54) CHANNEL SYSTEM FOR A VACUUM INSULATED STRUCTURE

(71) Applicant: WHIRLPOOL CORPORATION, Benton Harbor, MI (US)

(72) Inventors: Paul B. Allard, Coloma, MI (US); Jeffrey Beckner, Niles, MI (US); Sunil S. Ekshinge, Pune (IN); Abhay Naik, Stevensville, MI (US); Sanjesh Kumar Pathak, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,421

(22) Filed: Jul. 10, 2020

(65) Prior Publication Data

US 2020/0340613 A1 Oct. 29, 2020

Related U.S. Application Data

(63) Continuation of application No. 16/145,392, filed on Sep. 28, 2018, now Pat. No. 10,746,343.

(51) Int. Cl.
   *F16L 59/065* (2006.01)
   *F25D 23/06* (2006.01)
   *F25D 23/08* (2006.01)

(52) U.S. Cl.
   CPC .......... *F16L 59/065* (2013.01); *F25D 23/063* (2013.01); *F25D 23/066* (2013.01); *F25D 23/085* (2013.01); *F25D 2201/14* (2013.01)

(58) Field of Classification Search
   CPC .... F25D 23/063; F25D 23/062; F25D 23/064; F25D 23/06; F25D 23/066; F25D 23/085; F25D 2201/14; F16L 59/065; Y10T 428/231; C08J 2375/04; B32B 5/20
   USPC ........................................ 312/400, 401, 406
   See application file for complete search history.

(56) References Cited

U.S. PATENT DOCUMENTS

| | | | |
|---|---|---|---|
| 2,000,882 A | 5/1935 | Comstock |
| 3,010,262 A | 11/1961 | Rumsey |
| 3,052,019 A | 9/1962 | Strasser |
| 4,006,947 A | 2/1977 | Haag et al. |
| 5,665,301 A | 9/1997 | Alanko |
| 6,109,712 A | 8/2000 | Haworth et al. |
| 6,656,411 B1 | 12/2003 | McClure et al. |

(Continued)

FOREIGN PATENT DOCUMENTS

| | | |
|---|---|---|
| DE | 102011075390 A1 | 11/2012 |
| EP | 0857928 | 8/1998 |

(Continued)

*Primary Examiner* — Janet M Wilkens
(74) *Attorney, Agent, or Firm* — Price Heneveld LLP

(57) ABSTRACT

An appliance includes a panel having a raised landing outwardly extending from a first surface of the panel. A vacuum port is disposed on the raised landing. A system of channels is disposed over the first surface of the panel and outwardly extends therefrom. The system of channels substantially covers the first surface of the panel. The first surface of the panel is covered with a filter member that covers the system of channels. The raised landing, and vacuum port thereof, is fluidically coupled to the system of channels at multiple connecting locations.

20 Claims, 7 Drawing Sheets

(56) References Cited

U.S. PATENT DOCUMENTS

| | | |
|---|---|---|
| 8,137,784 B2 | 3/2012 | Veltkamp |
| 8,678,530 B2 | 3/2014 | Wilson et al. |
| 8,714,673 B2 | 5/2014 | Kim et al. |
| 10,605,520 B1 * | 3/2020 | Ekshinge ............... F25D 23/028 |
| 2011/0241514 A1 | 10/2011 | Nomura et al. |
| 2013/0257256 A1 | 10/2013 | Allard et al. |
| 2014/0015395 A1 | 1/2014 | Anthony et al. |
| 2017/0096284 A1 | 4/2017 | Hirano et al. |
| 2017/0276287 A1 | 9/2017 | Kawarazaki et al. |
| 2017/0276419 A1 | 9/2017 | Jeong et al. |
| 2017/0325634 A1 | 11/2017 | Cai et al. |
| 2019/0145697 A1 | 5/2019 | Naik et al. |
| 2019/0285336 A1 | 9/2019 | Naik et al. |
| 2020/0232593 A1 * | 7/2020 | Allard ................... F25D 23/065 |

FOREIGN PATENT DOCUMENTS

| | | |
|---|---|---|
| EP | 1335171 | 8/2003 |
| WO | 2015025477 A1 | 2/2015 |
| WO | 2018136053 A1 | 7/2018 |
| WO | 2018136054 A1 | 7/2018 |

\* cited by examiner

CHANNEL SYSTEM FOR A VACUUM INSULATED STRUCTURE

CROSS-REFERENCED TO RELATED APPLICATION

This application is a continuation of U.S. patent application Ser. No. 16/145,392, filed on Sep. 28, 2018, now U.S. Pat. No. 10,746,343, entitled CHANNEL SYSTEM FOR A VACUUM INSULATED STRUCTURE, the entire disclosure of which is hereby incorporated by reference.

BACKGROUND

The present concept generally relates to a channel system for a vacuum insulated structure, and more specifically, to a channel system that is embossed on a panel of an outer wrapper to provide a faster evacuation of the vacuum insulated structure.

SUMMARY

In at least one aspect, an appliance includes an outer wrapper having a first surface and a plurality of channels disposed along the first surface of the outer wrapper. A trim breaker interconnects the outer wrapper and an inner liner in an air-tight manner to define an insulation space therebetween. A vacuum port is disposed on the outer wrapper and is fluidically coupled to the plurality of channels.

In at least another aspect, an appliance includes a panel having a raised landing outwardly extending from a first surface of the panel. A vacuum port is disposed on the raised landing. A system of channels is disposed over the first surface of the panel and outwardly extends therefrom. First and second interconnecting channels are disposed on the panel and each include first ends fluidically coupled to the raised landing and second ends fluidically coupled to the system of channels at first and second connecting locations along the system of channels.

In at least another aspect, an appliance includes a panel having a vacuum port disposed thereon. A system of channels defining a channel loop is disposed over the panel. The channel loop includes a first end and a second end with a body portion disposed therebetween. The first end and the second end of the channel loop are fluidically coupled to the vacuum port.

These and other features, advantages, and objects of the present device will be further understood and appreciated by those skilled in the art upon studying the following specification, claims, and appended drawings.

DETAILED DESCRIPTION OF EMBODIMENTS

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
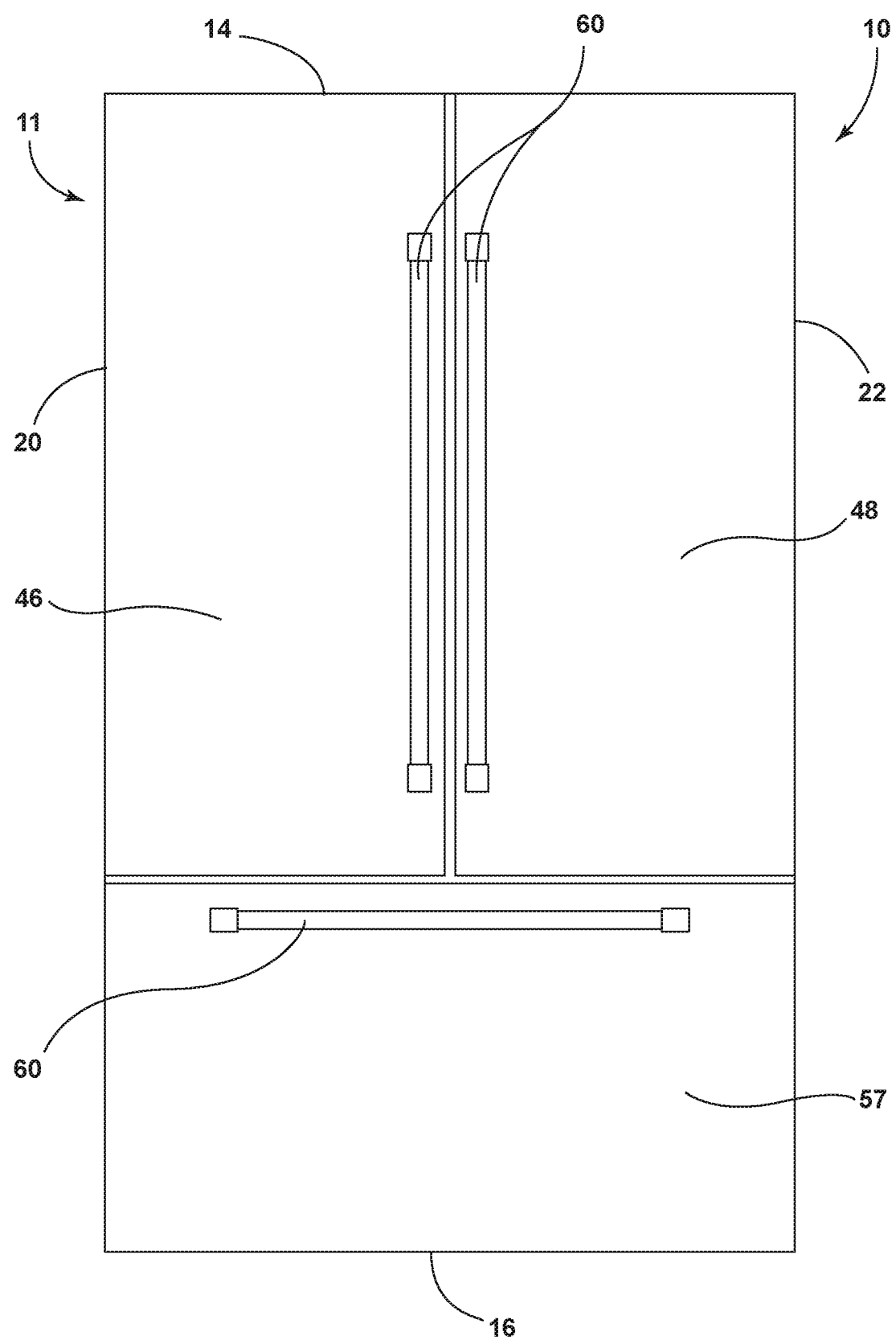
FIG. 1A is a front elevation view of an appliance for use with the present concept.
Figure 1B:
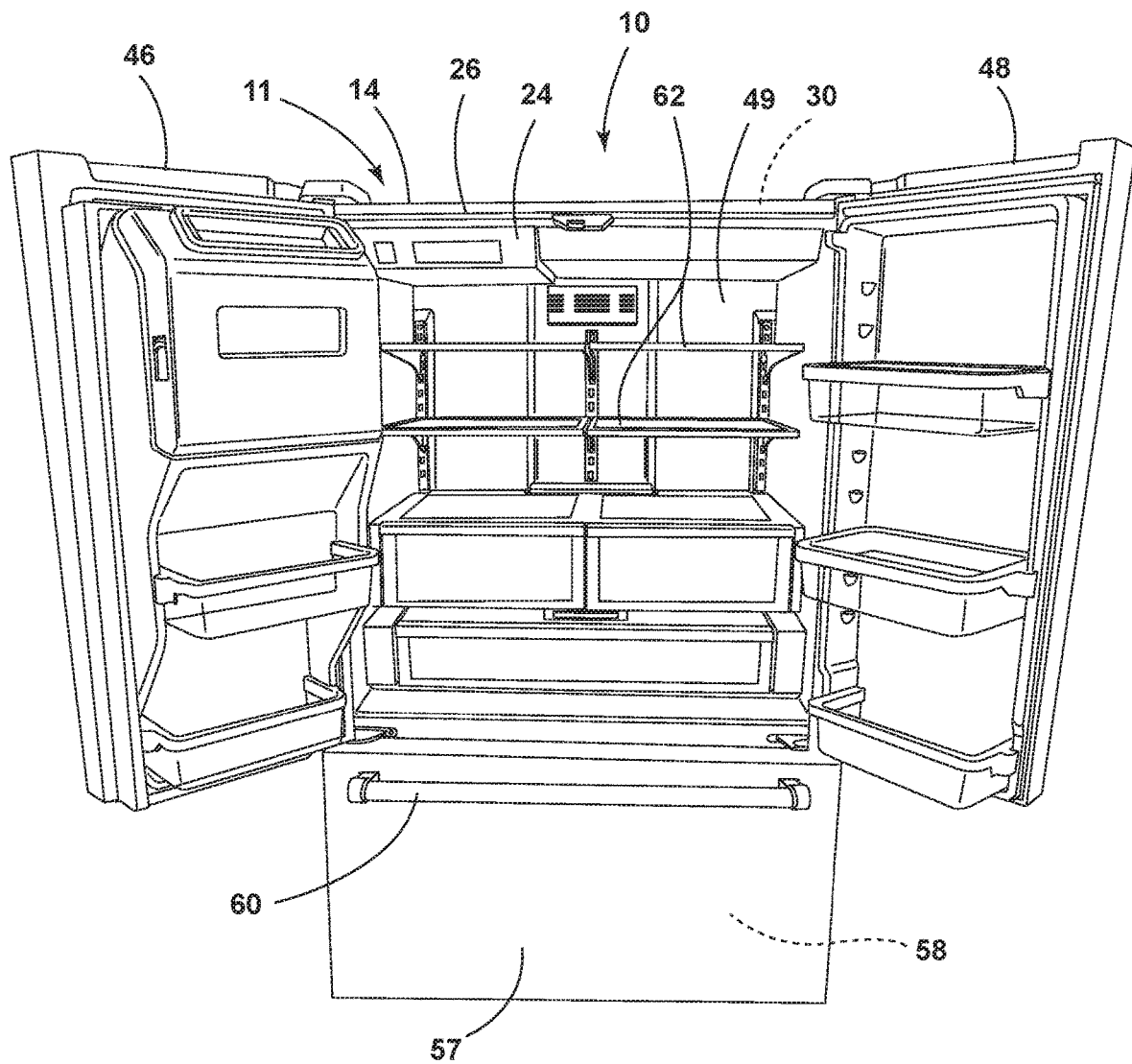
FIG. 1B is a front elevation view of the appliance of FIG. 1A with the doors open to reveal a refrigerator compartment.
Figure 2:
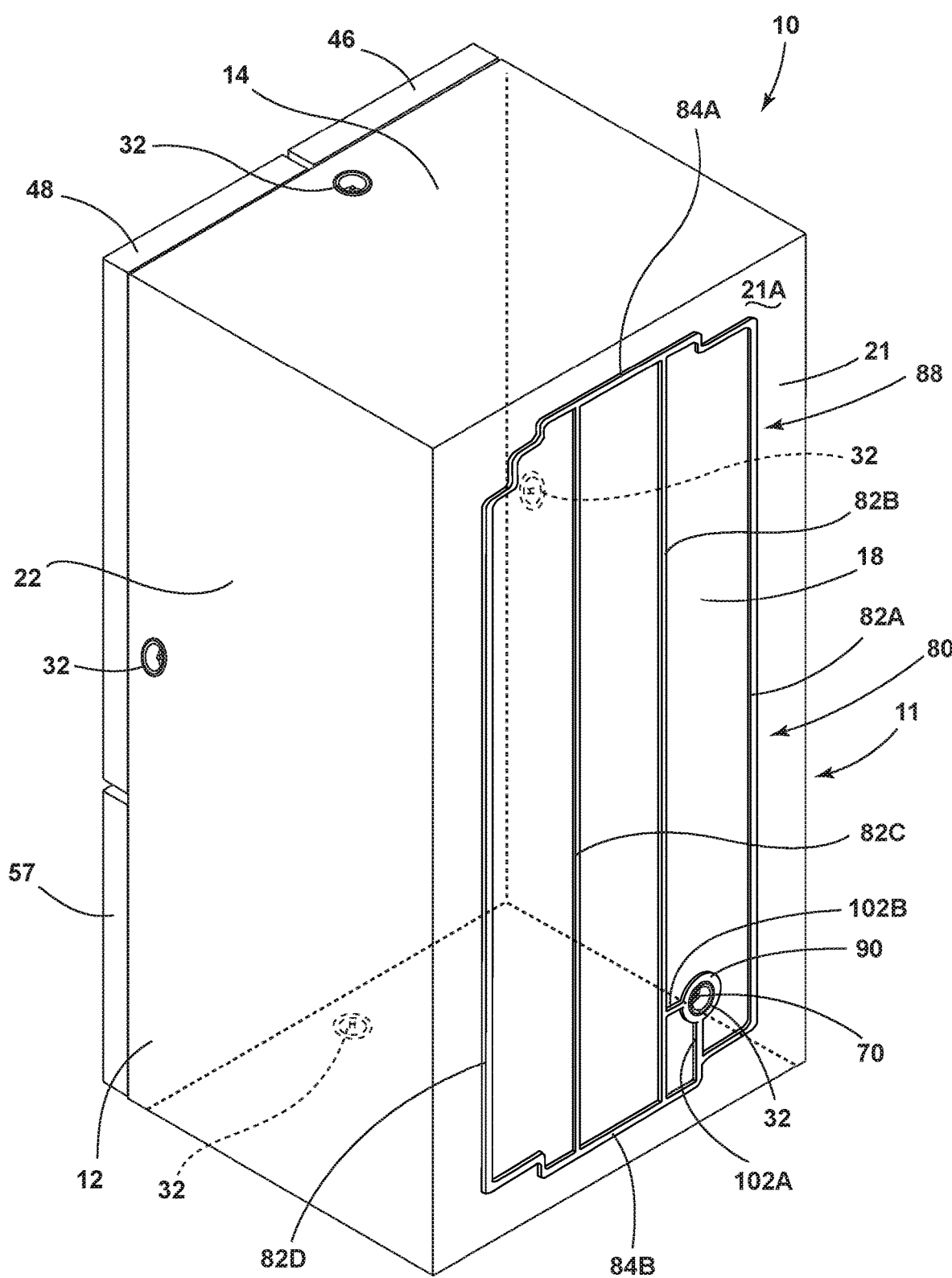
FIG. 2 is a rear perspective view of the appliance of FIG. 1A.

Referring now to FIGS. 1A-2, reference numeral 10 generally designates an appliance having a vacuum insulated structure 11 which includes an outer wrapper 12 that defines a top wall 14, a bottom wall 16, a rear wall 18, and first and second side walls 20, 22, and further includes an inner liner 24. A trim breaker 26 seals the outer wrapper 12 to the inner liner 24 to define an insulation space 30 (FIG. 1B) therebetween. A single vacuum port 32 (FIG. 2) is disposed on each of the top wall 14, the bottom wall 16, and the first and second side walls 20, 22. It is contemplated that any number of vacuum ports 32 may be provided on the outer walls of the outer wrapper 12, such that the present concept is not limited to the configuration of vacuum ports 32 shown in FIG. 2.

With reference again to FIGS. 1A-1B, the illustrated appliance 10 is a refrigerator assembly that includes French doors 46, 48 that are pivotally coupled to a refrigerator compartment 49 and operable between open and closed positions. The refrigerator assembly also includes a lower pull out drawer 57 that defines a freezer compartment 58. It will generally be understood that the features, as set forth herein, could be applied to any appliance having any general configuration. Further, the door configuration of the appliance 10 can vary from that shown in FIG. 1A. The doors 46, 48, as illustrated in FIG. 1A, include handles 60 configured to allow a user to move the doors 46, 48 between open and closed positions. The refrigerator compartment 49 and the freezer compartment 58 include shelving 62, as shown in FIG. 1B, that can be adjusted and moved, depending on consumer preference. The outer wrapper 12 of the appliance 10 is contemplated to be generally formed from a metal material, which may be steel, aluminum, etc. The inner liner 24 is also contemplated to be constructed from a metal material, which may be steel, aluminum, etc. However, sealed plastics, or other materials that can maintain an air-tight seal, could also be used in conjunction with the systems, as set forth herein.

With reference now to FIG. 2, the illustrated embodiment includes a plurality of vacuum ports 32 that are spaced at predetermined positions on the outer wrapper 12 to draw a sufficient amount of vacuum from areas of the insulation space 30 (FIG. 1B). An insulation material 34 (FIGS. 5 and 6) is disposed between the outer wrapper 12 and the inner liner 24 within the insulation space 30. A filter member 40 (FIG. 3A) is disposed proximate each vacuum port 32 (FIG. 5), such that air can be drawn from the insulation space 30 past the filter member 40 and through each vacuum port 32. Evacuation of the insulation space 30 via vacuum port 32 is further described below in conjunction with a system providing improved evacuation efficiency for the present concept.

As a result of the additional vacuum ports 32, the total vacuum time to place the insulation material 34 in a vacuum state and draw fluid (in the form of air) from the insulation space 30 is lessened. Consequently, refrigerator assemblies can be constructed at a faster rate and with a greater degree of negative pressure between the inner liner 24 and the outer wrapper 12. Each of the vacuum ports 32 is contemplated to include a valve system 70 configured to prevent air from entering the insulation space 30 after the vacuum process has been completed. In the illustrated embodiment of FIG. 2, a vacuum port 32 is disposed on each of the top wall 14, the bottom wall 16, the rear wall 18, and the first and second side walls 20, 22 of the outer wrapper 12. However, it will be noted that more vacuum ports 32 could be disposed on any of the top wall 14, the bottom wall 16, the rear wall 18, and the first and second side walls 20, 22 of the outer wrapper 12 to increase the speed in which a negative pressure is obtained within the insulation space 30.

In some instances, the vacuum ports 32 may be removed from certain walls of the appliance 10. For example, in the event the appliance 10 will have exposed first and second side walls 20, 22 that are readily viewable by the consumer, the vacuum ports 32 may be omitted from the first and second side walls 20, 22. In this instance, additional vacuum ports 32 may be disposed on first and second sides of the top wall 14 proximate the first and second side walls 20, 22 or on first and second sides of the bottom wall 16 in close proximity to the first and second side walls 20, 22. In addition, more vacuum ports 32 on the rear wall 18 may also be positioned on the outer wrapper 12 to compensate for the loss of a vacuum port 32 of each of the first and second side walls 20, 22. The valve system 70 incorporated into the vacuum ports 32 are configured to attach to a vacuum hose and may include ball valves, butterfly valves, check valves, choke valves, diaphragm valves, gate valves, globe valves, poppet valves, etc. A simple crimping solution or an end cap can also be used to close the vacuum hose. It will be understood that any kind and any number of valves may be used and that this disclosure is not limited by any of the valve systems noted above.

Figure 5:
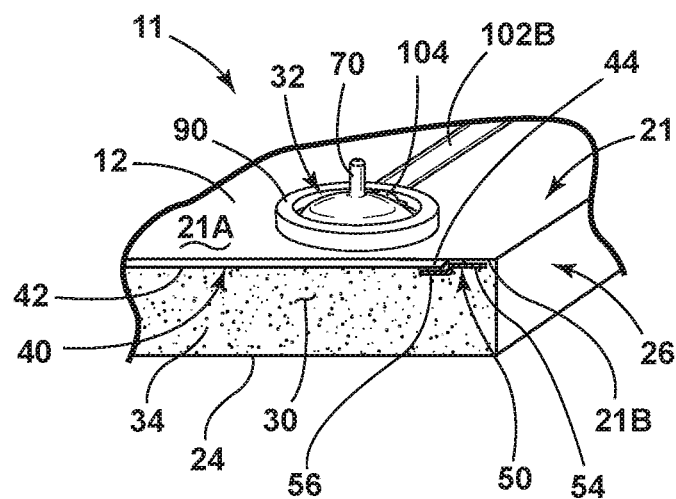
FIG. 5 is a cross-sectional view of the panel of FIG. 4 taken at line V.

It will be understood that the inner liner 24 and the outer wrapper 12 are connected at the trim breaker 26 generally disposed proximate the opening of the appliance 10, as shown in FIG. 1B. The trim breaker 26 is sealed and air-tight, such that air can neither escape nor enter into the insulation space 30 between the outer wrapper 12 and the inner liner 24 at the trim breaker 26. In addition, it will be understood that the insulation material 34 can be disposed throughout the appliance 10 in the insulation space 30. During assembly of the appliance 10, the insulation material 34 is poured, blown or otherwise inserted, into the insulation space 30 before the insulation space 30 is sealed air-tight. In addition, it will be noted that, as illustrated in FIG. 5, the filter member 40 is disposed between the vacuum port 32 and the insulation material 34. The filter member 40 acts to prevent insulation material 34 from being drawn through the vacuum port 32 when a negative pressure is placed on the insulation space 30. Accordingly, the insulation material 34 is maintained in the insulation space 30 between the outer wrapper 12 and the inner liner 24 as air is drawn from the insulation space 30 and insulation member 34 by an external vacuum pump and filtered by the filter member 40.

As further shown in FIG. 2, the rear wall 18 of the outer wrapper 12 includes a panel 21 which has a plurality of channels 80 which defines a system of channels. In the embodiment shown in FIG. 2, the plurality of channels 80 defining the system of channels of the panel 21 includes a number of vertical channels 82A-82D and upper and lower cross channels 84A, 84B. Vertical channels 82A, 82D are interconnected with the upper and lower cross channels 84A, 84B to define an outer perimeter 86 of the system of channels 80. As used herein, the term "system of channels" is used to describe a series of interconnected and multi-directional channels that may define a channel loop 88 within the system of channels 80. The channel loop 88 may be disposed along the outer perimeter 86 of the channel system 80. The channel loop 88 may also include intermediate channels, such as vertical channels 82B, 82C. The plurality of channels 80 are disposed on an outer surface 21A of the panel 21 and are contemplated to be created by an embossing process or stamping process that creates the plurality of channels 80 in a manner such that the plurality of channels 80 outwardly extends from the outer surface 21A of the panel 21.

As further shown in FIG. 2, the panel 21 also includes a raised landing 90 upon which the vacuum port 32 is disposed. The raised landing 90 is fluidically interconnected with the plurality of channels 80 via interconnecting channels 102A, 102B. Each of the interconnecting channels 102A, 102B include a first end 104 (FIG. 3B) that is fluidically coupled to the raised landing 90 and a second end 106 (FIG. 3B) that is fluidically coupled to the system of channels 80. In this way, the second ends 106 of the interconnecting channels 102A, 102B define first and second connecting locations along the system of channels 80 that are spaced-apart from one another and independent of one another. Thus, in the embodiment shown in FIGS. 2 and 3B, the raised landing 90 includes a plurality of interconnections to the system of channels 80 that allows for fluid communication between the raised landing 90 and the system of channels 80 at multiple locations. With the system of channels 80 and the raised landing 90 in fluid communication via multiple interconnecting channels 102A, 102B, the vacuum port 32 of the raised landing 90 is also in fluid communication with the system of channels 80. In this way, the vacuum port 32 can pull air anywhere along the length of the system of channels 80 to quickly evacuate the vacuum insulated structure 11. With this configuration, airflow from the system of channels 80 can be drawn to the raised landing 90 and the vacuum port 32 of the panel 21 via multiple directional airflow paths AF1, AF2. As further shown in FIG. 2, the system of channels 80, having vertical channels 82A-82D and upper and lower cross channels 84A, 84B spaced-apart along the outer surface 21A of the panel 21, the system of channels 80 substantially covers the panel 21. As used in this context, the term "substantially" is meant to define coverage of the panel 21 by the system of channels 80 that is commensurate with the overall length and width of the panel 21. Thus, in this case, the panel 21 is substantially covered by the system of channels 80 at the outer surface 21A of the panel 21 given that the vertical channels 82A-82D and the upper and lower cross channels 84A, 84B substantially span or cover the length and width of the panel 21.

With further reference to the embodiment shown in FIG. 2, the channel loop 88 may include a first end that is defined by the first connecting location (end 104 or end 106 of interconnecting channel 102A) and a second end that is defined by the second connecting location (end 104 or end 106 of interconnecting channel 102B) with a body portion of the channel loop 88 defined by the vertical channels 82A-82D and the upper and lower cross channels 84A, 84B.

Figure 3A:
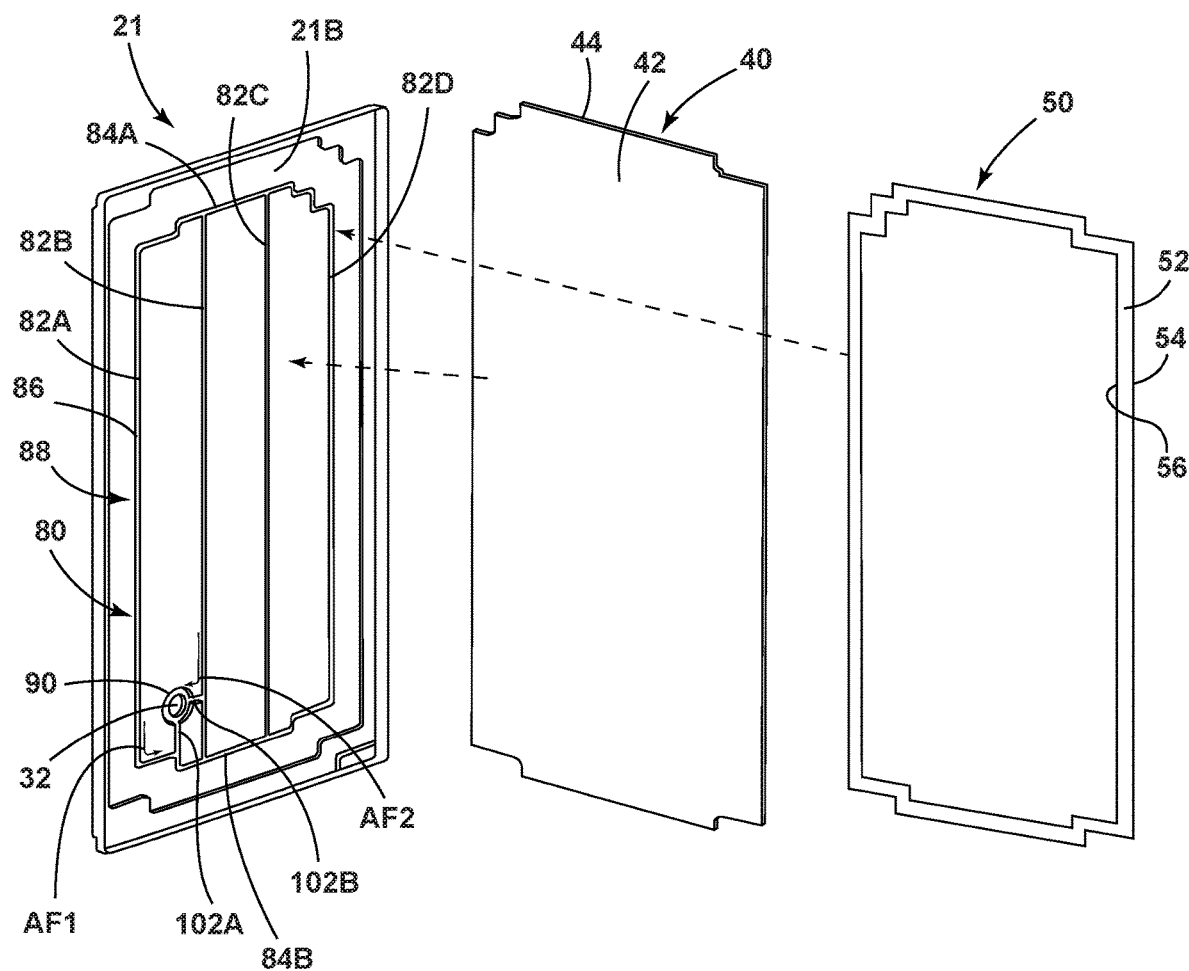
FIG. 3A is a perspective view of a panel of the appliance of FIG. 1A having a channel system embossed on an inner surface thereof and with a filter member and an adhesive member exploded away therefrom.
Figure 3B:
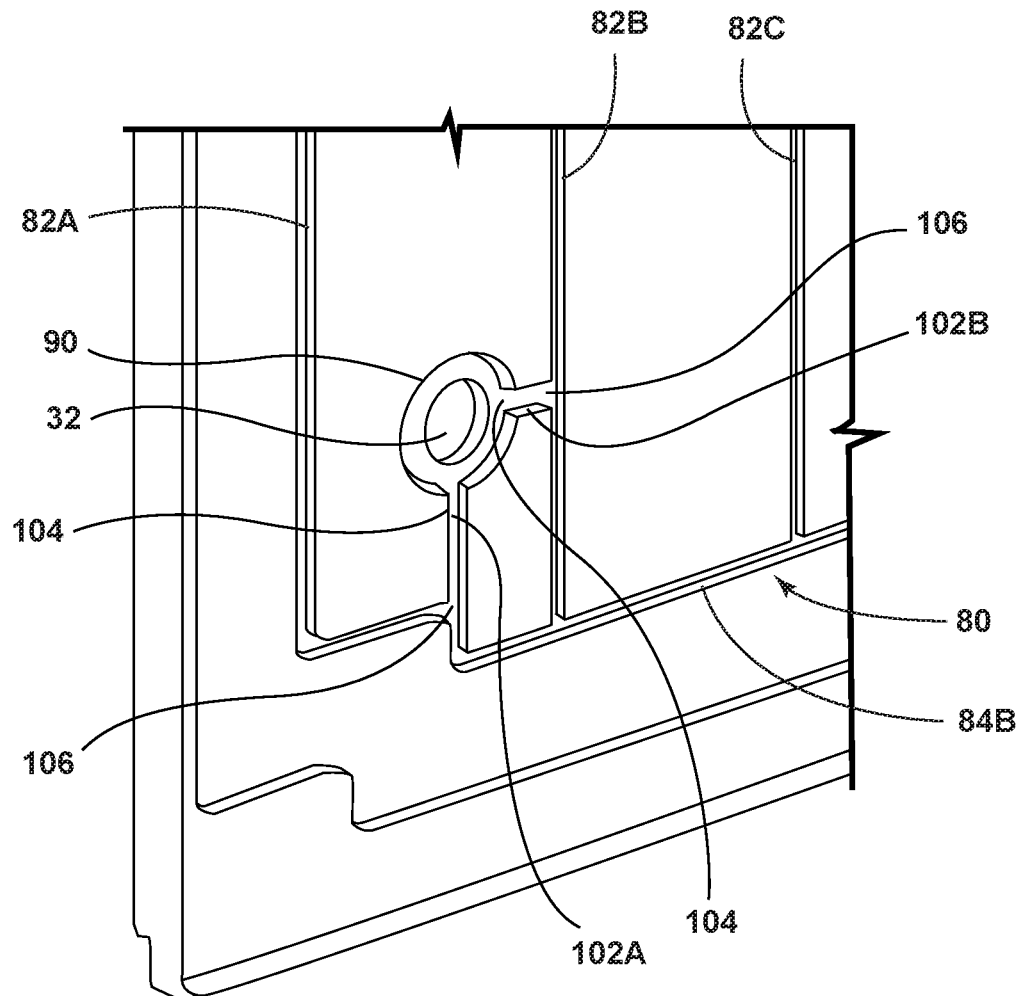
FIG. 3B is a zoomed-in view of a raised landing of the panel of FIG. 3A.
Figure 4:
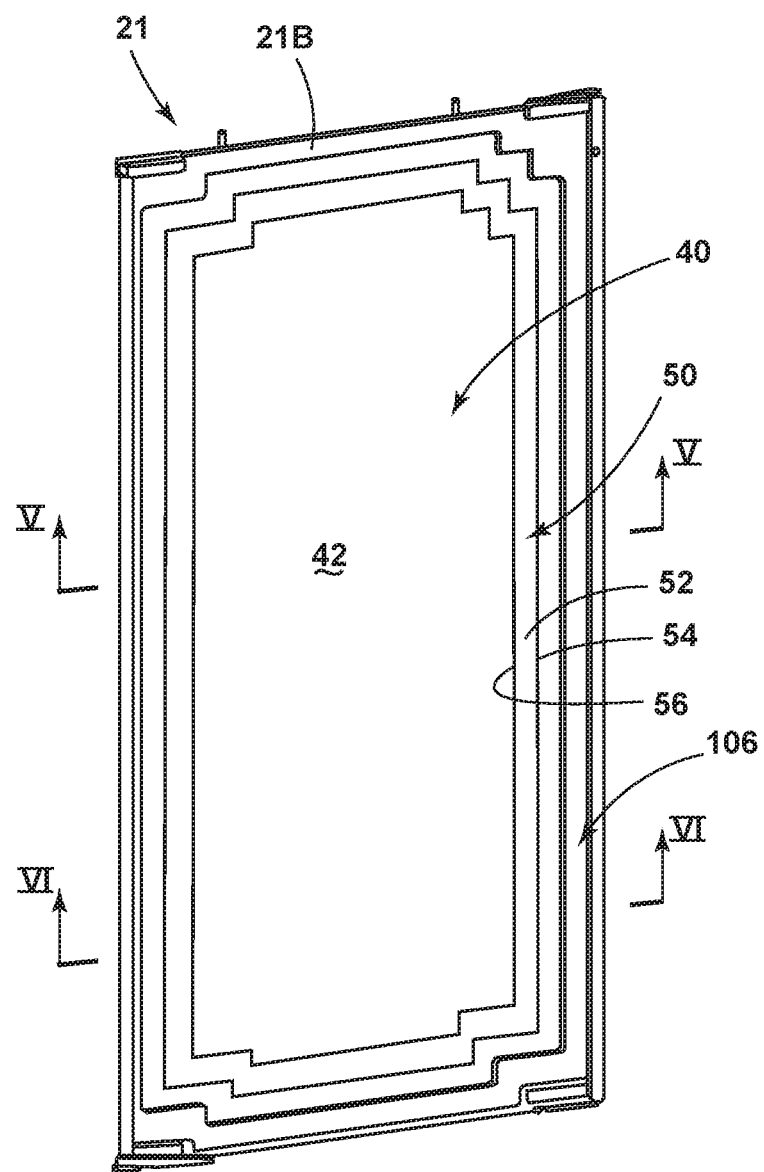
FIG. 4 is a perspective view of the panel of FIG. 3A with the filter member and the adhesive member coupled to the inner surface of the panel to cover the system of channels.
Figure 6:
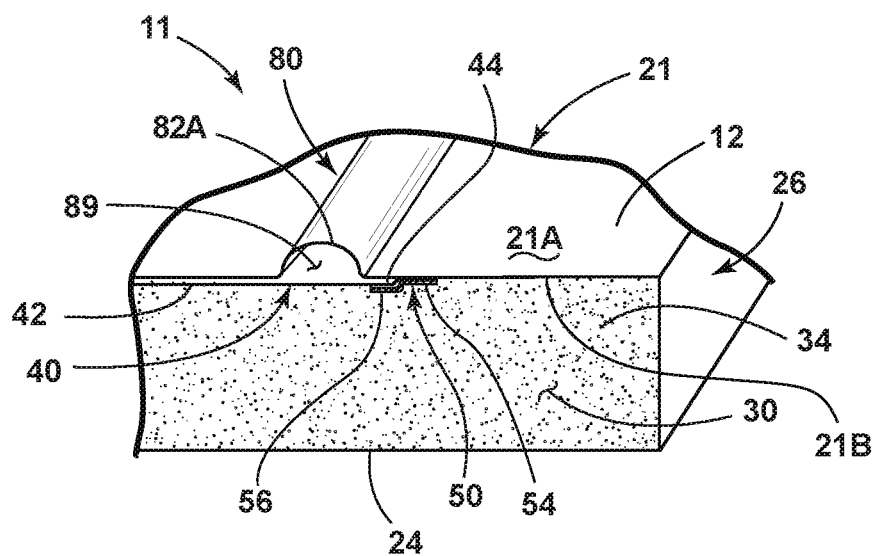
FIG. 6 is a cross-sectional view of the panel of FIG. 4 taken at line VI.

Referring now to FIG. 3A, the panel 21 is shown from an inner surface 21B thereof. The system of channels 80 is shown as being inset from the inner surface 21B of the panel 21, as opposed to outwardly extending from the outer surface 21A of the panel 21 shown in FIG. 2. In FIG. 3A, a filter member 40 is shown having a body portion 42 with an outer perimeter edge 44. The filter member 40 is shown in FIG. 3A as exploded away from the inner surface 21B of the panel 21, however, it is contemplated that the filter member 40 is affixed to the inner surface 21B of the panel 21 in assembly, and is sized appropriately to cover the entirety of the system of channels 80, the raised landing 90 and the vacuum port 32 of the panel 21. The filter member 40 is contemplated to be comprised of a sheet of paper material which is configured to allow for the passage of air from the insulation space 30 to the system of channels 80, while retaining the insulation material 34 within the insulation space 30. Thus, the paper material of the filter member 40 may be a filter paper material that is porous to airflow, but prevents the insulation material 34 from entering the system of channels 80 during an evacuation procedure. Being sized to cover the entirety of the system of channels 80, the filter member 40 substantially covers the inner surface 21B of the panel 21 in assembly, as shown in FIG. 4. As used in this context, the term "substantially" is meant to define coverage of the panel 21 by the filter member 40 that is commensurate with the overall length and width of the panel 21. The filter member 40 is affixed to the inner surface 21B of the panel 21 by an adhesive member 50. The adhesive member 50 includes a frame assembly 52 that substantially follows the contours of the outer perimeter edge 44 of the filter member 40. In this way, the adhesive member 50 can be used to interconnect the inner surface 21B of the panel 21 and the filter member 40 by the frame assembly 52 surrounding the outer perimeter edge 44 of the filter member 40. Specifically, the adhesive member 50 includes a first portion 54 which is configured to couple to the inner surface 21B of the panel 21, and a second portion 56 which is configured to adhere to the filter member 40 adjacent the outer perimeter edge 44 thereof. Coupling of the filter member 40 to the panel 21 using the first and second portions 54, 56 of the adhesive member 50 is shown in FIGS. 5 and 6. In this way, when the adhesive member 50 interconnects the filter member 40 and the inner surface 21B of the panel 21, the filter member 40 will remain in place over the system of channels 80 as best shown in FIG. 4.

Referring now to FIG. 5, a portion of the vacuum insulated structure 11 is shown, wherein the trim breaker 26 interconnects the panel 21 of the outer wrapper 12 and the inner liner 24 in an air-tight manner to define the insulation space 30 therebetween. A vacuum port 32 is shown disposed on the panel 21 of the outer wrapper 12 at the raised landing 90 thereof. The vacuum port 32 is shown as being fluidically coupled to an interconnecting channel 102B which, as noted above, is fluidically coupled to the system of channels defined by the plurality of channels 80. As further shown in FIG. 5, the filter member 40 covers the inner surface 21B of the panel 21 adjacent the location of the raised landing 90 and the vacuum port 32. As noted above, the filter member 40 substantially covers the inner surface 21B of the panel 21, such that the filter member 40 covers the entirety of the system of channels 80, the raised landing 90 and the vacuum port 32. As further shown in FIG. 5, the adhesive member 50 includes portions 54 and 56 which are coupled to and interconnect the inner surface 21B of the panel 21 and the filter member 40, respectively. It is contemplated that the adhesive member 50 may include a one-sided tape material.

Referring now to FIG. 6, a portion of the vacuum insulated structure 11 is shown, wherein the trim breaker 26 interconnects the panel 21 of the outer wrapper 12 and the inner liner 24 in an air-tight manner to define the insulation space 30 therebetween. An insulation material 34 is shown disposed within the insulation space 30 in FIGS. 5 and 6. A vertical channel 82A of the system of channels 80 is shown in FIG. 6 as being disposed on the panel 21 of the outer wrapper 12. The vertical channel 82A is shown as being inset from the inner surface 21B of the panel 21 and, as a corollary, the vertical channel 82A is shown extending outwardly from the outer surface 21A of the panel 21. As further shown in FIG. 6, the filter member 40 covers the inner surface 21B of the panel 21 adjacent the location of the vertical channel 82A. Thus, as a vacuum is drawn on the vacuum insulated structure 11 via a vacuum port, such as vacuum port 32 shown in FIG. 5, a passage way 89 of the vertical channel 82A remains clear for airflow to properly evacuate the vacuum insulated structure 11. Thus, the filter member 40 prevents any of the insulation materials 34 from entering the system of channels 80 when the vacuum insulated structure 11 is evacuated and pressurized.

A vacuum insulated structure, such as vacuum insulated structure 11 described above, has very low heat gain due to the presence of a vacuum inside a highly porous structure reducing the heat transfer through gas conduction, convection and radiation. This vacuum is created by drawing the air inside the vacuum insulated structure 11 using pumps coupled to the vacuum ports 32 of the vacuum insulated structure 11. The process of removing air inside the insulation space 30 to create the vacuum is time intensive. For example, a simple rectangular panel structure having the following dimensions (1 m long×1 m wide×0.05 m thick) can take around 4 days for a sufficient evacuation at a single vacuum port. The present concept helps to reduce evacuation time by about 70% by allowing air to be drawn along an entire system of channels 80, as compared to a single aperture at a vacuum port location. This particular concept provides a design to reduce air travel distance during an evacuation procedure, which eventually reduces evacuation time. Here, vacuum channels masking up the system of channels 80 are well connected to each other and also well connected to the vacuum port 32. To each channel of the system of channels is closed from an inner side thereof by a filter member 40 to create interior passage ways 89 (FIG. 6) between the filter member 40 and the system of channels 80. This configuration allows air to pass through the filter member 40 from the insulation space 30 and into the channels of the system of channels 80 when a pump starts drawing from a vacuum port that is fluidically coupled to the system of channels 80. As the system of channels 80 is widely spread all over the surface of insulation material 34, air disposed within the insulation material 34 and within the insulation space 30 has a short distance to travel to reach the vacuum port, as opposed to a single aperture vacuum port system. This results in a faster evacuation time for a vacuum insulated cabinet comprising the present concept.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A wrapper for an appliance, comprising:
   a panel;
   a system of channels disposed on the panel;
   a vacuum port disposed on the panel, wherein the vacuum port is fluidically coupled to the system of channels;
   a filter member having a porous body portion with an outer perimeter edge, wherein the porous body portion of the filter member covers the system of channels, such that air can be drawn through the porous body portion of the filter member to the system of channels via the vacuum port; and
   an adhesive member having a frame assembly that surrounds the outer perimeter edge of the filter member, wherein the frame assembly interconnects the outer perimeter edge of the filter member to the panel.

2. The wrapper of claim 1, wherein the frame assembly of the adhesive member includes first and second portions, and further wherein the first portion of the frame assembly is coupled to the panel and the second portion of the frame assembly is coupled to the filter member.

3. The wrapper of claim 1, wherein the system of channels includes one or more vertical channels and one or more cross channels.

4. The wrapper of claim 3, wherein the one or more vertical channels are interconnected with the one or more cross channels to define a channel loop.

5. The wrapper of claim 4, wherein the panel includes a raised landing, and further wherein the vacuum port is disposed on the raised landing.

6. The wrapper of claim 5, including:
   a first interconnecting channel having a first end fluidically coupled to the raised landing and a second end fluidically coupled to the system of channels at a first connecting location.

7. The wrapper of claim 6, including:
   a second interconnecting channel having a first end fluidically coupled to the raised landing and a second end fluidically coupled to the system of channels at a second connecting location.

8. The wrapper of claim 7, wherein the first and second connecting locations are spaced-apart from one another along the system of channels.

9. The wrapper of claim 1, wherein the system of channels outwardly extends from an outer surface of the panel.

10. The wrapper of claim 5, wherein the filter member is positioned on an inner surface of the panel that is opposed to the outer surface of the panel.

11. A wrapper for an appliance, comprising:
    a panel having a first surface;
    a series of interconnected and multidirectional channels disposed on the first surface of the panel and defining a system of channels;
    a vacuum port disposed on the panel and fluidically coupled to the system of channels; and
    a filter member substantially covering the first surface of the panel, such that air can be drawn through the filter member to the system of channels via the vacuum port.

12. The wrapper of claim 11, including:
    a raised landing disposed on the first surface of the panel, wherein the vacuum port is disposed on the raised landing.

13. The wrapper of claim 12, including:
    a first interconnecting channel having a first end fluidically coupled to the raised landing and a second end fluidically coupled to the system of channels at a first connecting location.

14. The wrapper of claim 13, including:
    a second interconnecting channel having a first end fluidically coupled to the raised landing and a second end fluidically coupled to the system of channels at a second connecting location.

15. The wrapper of claim 14, wherein the first and second connecting locations are spaced-apart from one another along the system of channels.

16. A wrapper for an appliance, comprising:
a panel having inner and outer surfaces;
a series of interconnected and multidirectional channels disposed on the outer surface of the panel and defining a system of channel having first and second airflow paths;
a vacuum port disposed on the panel and fluidically coupled to the system of channels; and
a filter member substantially covering the inner surface of the panel, such that air can be drawn through the filter member to the system of channels via the vacuum port through at least one of the first and second airflow paths.

17. The wrapper of claim 16, wherein the system of channels substantially covers the outer surface of the panel.

18. The wrapper of claim 17, including:
first and second interconnecting channels, wherein both the first and second interconnecting channels each include first ends fluidically coupled to the vacuum port and second ends fluidically coupled to the first and second airflow paths, respectively, at first and second spaced-apart connecting locations.

19. The wrapper of claim 16, including:
an adhesive member having a frame assembly that surrounds an outer perimeter edge of the filter member, wherein the frame assembly interconnects the outer perimeter edge of the filter member to the inner surface of the panel.

20. The wrapper of claim 16, wherein the panel includes a metal panel.

* * * * *